(12) United States Patent
Phelan

(10) Patent No.: US 7,644,787 B2
(45) Date of Patent: Jan. 12, 2010

(54) TURBOFAN POWERED VEHICLE WITH SPHERICAL WHEELS

(76) Inventor: James V. Phelan, 10110 Sepulveda Blvd., Mission Hills, CA (US) 91345

( * ) Notice: Subject to any disclaimer, the term of this patent is extended or adjusted under 35 U.S.C. 154(b) by 61 days.

(21) Appl. No.: 11/490,794

(22) Filed: Jul. 21, 2006

(65) Prior Publication Data

US 2008/0017424 A1    Jan. 24, 2008

(51) Int. Cl.
*B62D 57/00* (2006.01)
(52) U.S. Cl. .............................. 180/7.1; 180/20; 188/29
(58) Field of Classification Search ................ 180/7.1, 180/7.3, 20; 16/35 R; 280/11.2; 188/29
See application file for complete search history.

(56) References Cited

U.S. PATENT DOCUMENTS

| 636,757 | A | * | 11/1899 | Carraway ...................... 16/28 |
| 1,999,296 | A | | 4/1935 | Juergens |
| 2,021,784 | A | | 11/1935 | Hochstadt |
| 2,705,935 | A | | 4/1955 | Peterson |
| 2,758,661 | A | | 8/1956 | Peterson |
| 2,812,031 | A | | 11/1957 | Aghnides |
| 2,969,751 | A | | 1/1961 | Toulmin |
| 3,433,317 | A | | 3/1969 | Peterson |
| 3,480,289 | A | | 11/1969 | Larkin |
| 3,511,454 | A | | 5/1970 | Hamilton |
| 3,683,840 | A | | 8/1972 | Russell |
| 4,230,198 | A | | 10/1980 | Eickmann |
| 4,327,808 | A | | 5/1982 | Howard |
| 4,785,899 | A | | 11/1988 | von Winckelmann |
| 4,892,305 | A | * | 1/1990 | Lynch ........................ 482/132 |
| 5,192,099 | A | * | 3/1993 | Riutta ................... 280/11.201 |
| 5,291,846 | A | | 3/1994 | Davis |
| 5,465,986 | A | * | 11/1995 | MacRae ................ 280/33.994 |
| 5,755,449 | A | * | 5/1998 | Pozzobon .............. 280/11.214 |
| 6,217,038 | B1 | * | 4/2001 | Moe ...................... 280/11.207 |
| 6,298,952 | B1 | * | 10/2001 | Tsai ............................. 188/29 |
| 6,386,330 | B1 | * | 5/2002 | Wei .............................. 188/29 |
| D484,397 | S | * | 12/2003 | Lee ............................. D8/375 |
| 6,802,381 | B1 | | 10/2004 | Koors |
| 2002/0152178 | A1 | * | 10/2002 | Lee ............................. 705/67 |

* cited by examiner

*Primary Examiner*—Tony H. Winner
(74) *Attorney, Agent, or Firm*—Colin P. Abrahams

(57) ABSTRACT

A vehicle having a chassis comprises a turbofan engine mounted on the chassis for providing thrust to propel the vehicle over a surface, and four wheels located about and mounted on the chassis wherein at least two of the wheels are substantially spherical or partially spherical in shape. Braking systems, steering systems and stabilizing mechanisms may be provided in accordance with various aspects of the invention.

20 Claims, 5 Drawing Sheets

TURBOFAN POWERED VEHICLE WITH SPHERICAL WHEELS

FIELD AND BACKGROUND OF THE INVENTION

This invention relates to a turbofan powered vehicle with spherical wheels. The invention also relates to vehicles powered by a turbine engine, preferably, a turbofan engine, and having spherical wheels, or wheels which are least in part spherical.

U.S. Pat. No. 4,785,899 (von Winckelmann) shows a vehicle with spherical shaped wheels, including a front wheel and rear wheel, both capable of being tilted about their respective horizontal shafts, and rotatably mounted on axles. U.S. Pat. No. 6,802,381 (Koors) teaches a propulsion mechanism having a spherical ball, with first and second propulsion mechanisms in the ball itself. U.S. Pat. No. 4,230,198 (Eickmann) teaches a fluid-stream driven ground vehicle. Movement of the vehicle is independent of the ground on which the vehicle travels, enabling it to travel on slippery ground.

U.S. Pat. No. 2,812,031 (Aghnides) teaches a vehicle with inclined hemi-spheroidal wheels, providing the vehicle with more traction area and greater buoyancy than one with conventionally disposed wheels. U.S. Pat. No. 4,327,808 (Howard) teaches a land motor having an aerodynamic propeller at the anterior and posterior ends for providing aerodynamic propulsion.

U.S. Pat. No. 2,705,935 (Peterson) teaches a propeller driven motor vehicle, to propel a vehicle using fans or propellers. U.S. Pat. No. 3,480,289 (Larkin) teaches a surface vehicle which may be propelled by a rear-mounted engine, and propeller.

U.S. Pat. No. 2,969,751 (Toulmin) shows a method and apparatus for land transportation which includes a turbo-jet. This constitutes a source of power for propelling the vehicle. A rocket may be substituted therefor. This invention also describes a hub, having three equally spaced propeller blades, and a further embodiment of turbo-jets. U.S. Pat. No. 3,511,454 (Hamilton) teaches a gyro-stabilization apparatus where the primary drive power is derived from a twin-pod of jet engines adjustably secured after the end of the vehicle.

SUMMARY OF THE INVENTION

According to one aspect of the invention, there is provided a vehicle having a chassis comprising a turbine engine mounted on the chassis for providing thrust to propel the vehicle over a surface; and four wheels located about and mounted on the chassis wherein at least two of the wheels are substantially spherical or partially spherical in shape. Preferably, the turbine engine comprises at least one turbofan engine mounted on the vehicle in an orientation to propel the vehicle in a forward direction.

Preferably, two turbofan engines are provided and each of the turbofan engines is capable of delivering a variable thrust depending on the direction and/or speed of the vehicle. There may be a pair of forward thrust turbofan engines mounted in a spaced relationship on the roof of the vehicle and positioned to move the vehicle in a forward direction, and a single rear thrust turbofan engine positioned to move the vehicle in a rearward direction. In one embodiment, the rear thrust turbofan engine is mounted between the pair of forward thrust turbofan engines.

In one aspect, a platform is mounted on a roof of the vehicle, the platform being configured to received and hold the at least one turbofan engine. The platform may be movable relative to the roof of the vehicle, the platform being movable according to the direction of travel of the vehicle so that the turbofan engines mounted thereon are capable of selectively providing thrust substantially in the direction of movement of the vehicle.

Preferably, the wheels are substantially hollow spheres. All of the wheels may be substantially spherical in shape and mounted in wheel casings. In one form, each wheel is mounted on an axle running substantially diametrically therethrough, the axle having ends located outside the wheel which are supported by the wheel casing. A ball bearing device may be formed on each end of the axle within the wheel which abuts against an inner surface of the wheel.

In one embodiment, at least one of the wheels is comprised of three components comprising a center strip portion and two lateral portions, the components being separable from each other to permit replacement of the center strip portion when required due to wear thereon. The wheels may be coated with a material, such as Teflon®, to reduce friction with the surface on which the vehicle is moving.

Preferably, the vehicle further comprises a brake member, the brake member comprising a substantially dome shaped pad hydraulically operated so as to be engageable with a wheel when activated and distanced from the wheel when not activated. The dome shaped pad may be comprised of leather.

In another aspect, the vehicle further comprises a shock absorption member between the wheel and the casing to absorb at least partially bumps on the surface on which the vehicle is moving from being transmitted to the chassis. The shock absorption member may comprise a channel in a wall of the casing and a projection on the wheel or axle which travels in the channel against the force of a biasing means.

The vehicle may also comprise a locking means for locking the projection relative to the channel to prevent movement thereof.

In another embodiment of the invention, the vehicle may have a stabilizing device for selectively applying a downward force to at least one of the wheels to provide a countervailing force on the wheel to enhance traction with the surface on which the vehicle is moving. The stabilizing device may comprise a pneumatically or hydraulically operated force bar which acts downwardly on a the wheel casing with a force which can be varied according to the direction and speed of the vehicle. The wheel casing may comprise an arm at the top thereof, the force bar applying the downward force on the arm of the wheel casing.

In yet another embodiment, the vehicle may comprise a steering mechanism for steering at least the front wheels of the vehicle, although the steering mechanism may steer both the front and rear wheels of the vehicle. The steering mechanism may comprise a steering wheel assembly and a tie rod extending from a steering wheel assembly to a wheel casing in which each of the wheels is housed. The steering mechanism may be configured so as to be able to pivot at least the front pair of wheels through an angle of 90°. Preferably, the steering mechanism is configured so as to be able to pivot all four wheels through an angle of 90°.

This invention thus relates to turbine powered vehicles which are mounted on wheels of spherical shape, or being comprised at least partially of a substantial spherical shape.

In one aspect, the invention provides a vehicle which rolls on four generally hollow, hard, substantially spherical balls, which may have Teflon® or other suitably coated surfaces, as required. The spherical-type wheels result in a reduced or minimal contact with the road, so that the vehicle can roll on the wheels with reduced or minimal propulsion.

In accordance with the invention, the wheels are not used to propel the vehicle, so that the required traction between the wheels and the surface on which the vehicle is moving can be reduced. The propulsion comes from a turbine engine, preferably a turbofan engine, which is mounted preferably on a movable platform on the top of the car. Preferably, two propulsion engines are provided instead of one, and in accordance with a preferred embodiment of the invention, when the vehicle is going around curves, the outer engine will supply all or most of the power, while the inner engine will reduce power. Furthermore, the movable platform upon which the engines are mounted may also turn in response to the turning of the steering wheel which will provide a concomitant shift in the direction of propulsion from straight-ahead to that reflecting the nature of the curve.

The invention may also comprise an additional backward or rear-thrust engine, designed to supply braking force. Such an engine may provide most of the braking force in an emergency stop, although the amount of braking force can of course be adjusted.

Ordinary braking or slowing may be accomplished by a pad, which may preferably comprised of leather or other suitable material, and which may descend down the interior of the spherical wheel casing to the top of the ball-shaped wheel, so as to engage the ball to prevent rotation thereof and thereby stop the car. In a preferred embodiment, the vehicle may have one brake pedal that can activate two braking systems: first, for ordinary braking, the brake pedal will be depressed a moderate amount to activate the pad device; second, for emergency braking, the brake pedal will be depressed extremely to activate the rearward thrust engine.

In accordance with the invention, the procedure for parking the vehicle is much simplified. The vehicle is pulled up alongside a parking space, the ball casings containing the spherical wheels are rotated 90°, and the engine platform may also be rotated, up to the same amount. The appropriate thrust from the selected engine is activated, and the vehicle can ease into the parking space laterally. Exiting from the parking space can be achieved using similar procedures, in reverse.

Shock absorption structures and mechanisms may also be incorporated into the design of the vehicle. In one embodiment, the spherical ball may ride up and down a given amount within the ball casing, for example, approximately, 3 inches, and, like conventional cars and shock absorption systems, struts and springs can be used between the spherical wheels and the connection thereof to the vehicle.

In a preferred form of the invention, the spherical wheels or balls are contained within ball casings, which are attached to the vehicle frame or chassis. In one form, a ring may be provided on top of the ball casing, and would constitute the bottom part of a ball bearing construction wherein the bottom half would move and the top half would be stationary and attach to the frame. It is the furthest extension of the arm which is acted upon by the downward pressure of the force bar as part of the stabilizing device described above. The arm is attached to the frame.

In one form of the invention, the steering assembly and mechanism may consist of rods which are attached to the top of the ball casings. Since the ball wheel is preferably hollow, that part of the ball closest to the side of the vehicle can be used to house a lubricated ball-bearing construction, or on both sides, which joins the spherical wheel and the rod which runs through it so as to absorb the weight of the vehicle, but at the same time allowing the spherical wheel to turn.

In accordance with one aspect of the invention, there is also provided a cornering aid structure and mechanism. Preferably, the cornering aid comprises a pneumatic device, which may be powered by an electric motor, which applies a counter-vailing downward force in opposition to the force of inertia which occurs when making sharp turns. Such a cornering aid would preferably be mounted on the top of each spherical ball casing, and may be computer controlled. For example, in use, when a turn or a sharp turn to the right is made, the right side of the car lifts in response to the force of the turn. The computer would receive signals which would analyze this change, and send a message to an electric motor which in turn would power the pneumatic devices mounted on one or both of the ball casings on the right side of the car in order to provide a necessary downward countervailing force to keep the wheels more firmly on the ground.

As regards the propulsion mechanism, a turbine is preferably used. Different types of turbine engines are known, and these include a turbojet, typically used in high-performance, commercial and other aircraft. Another type of turbine engine is the turboprop which produces two thrusts, one with the propeller and the other through exhaust.

Yet a further type is the turbofan engine, essentially a compromise between the turboprop and the turbojet engines. The turbofan includes a large internal propeller and streams of air flowing through the engine. The fan is typically smaller than a propeller and enclosed inside a duct or cowling for better controlled aerodynamics.

In accordance with the present invention, the turbofan type engine would be preferred for use on the vehicle of the invention.

Further, in accordance with the invention, the turbofan could one of two types, one powered electrically, either from a battery or a hybrid arrangement of an electric and fuel engine, or the engine may be powered in a conventional form using a jet or other fuel, or a fuel substitute such as ethanol instead of the jet fuel.

Preferably, the turbofan engines may be custom designed to take the certain relevant factors into consideration. First, it should be noted that a turbofan needed to drive a vehicle in accordance with the present invention requires nowhere near the thrust requirement of even the smallest turbofan engines used in airplanes. Of course, the power needed to get an airplane airborne will be substantially greater than that required to propel a car rolling on balls or spherical wheels, especially when the wheels are coated to reduce traction and friction.

Second, because the thrust requirement of the turbofan engine is relatively low, it may be possible to use an electric equivalent-type engine, which can be powered by a battery or by a hybrid power source in many vehicles available today.

Third, where a standard power turbofan engine is used, one developed for using alternative fuels instead of standard jet fuels may be preferable. Additionally, since individuals or objects may be subject to the exhaust thrust of the engine, the turbofan engine would be designed so that the thrust comes exits rearwardly at an angle which would typically be high enough to go over the heads of people or objects which may be in the path thereof.

With respect to the cornering aid device disclosed, these may of course, as mentioned, be pneumatically operated, and may also be used to combat slipperiness which may occur in wet weather. If the weight of the car is insufficient to prevent its slipping on a surface, the pneumatic devices, which are also used to provide stability in turning, may all be set so as to provide a small fixed, downward pressure so as to provide a downward force, thus improving contact between the spherical wheels and the driving surface. Such a mechanism may lower the mileage of the vehicle, but would be a significant safety feature at the appropriate time.

In a preferred embodiment, the steering consists of a steering wheel which activates a power-steering motor. The power-steering motor in turn activates four tie rods which extend from the steering motor to the top of the four ball casings in which the spherical wheels are housed. At the casings, the rods connect to a gear box, which is capable of turning the casing up to 90°. The ability to turn the ball casings as much as 90° is important in the simplified parking mechanism, as already discussed.

Generally, the steering mechanism consists of a conventional mechanism whereby only the two front wheels turn in unison. However, in an alternative embodiment, a steering mechanism whereby the casings of all four wheels are turned, may be provided.

As mentioned, some shock absorption may be provided by permitting the spherical wheel or ball to ride up and down within the ball casing, up to three inches or more. In one form, this may be accomplished by providing structure where, at the two points on either side of the ball, where it connects with the sides of the ball casing, the ball is connected to a separate and movable pieced of the ball casing, which slides up and down in a channel, built into the side of the ball casing.

Since the weight of the car would normally cause the ball to ride up the three inches to the top of the channel, a spring device may be built into the movable piece of the ball casing to resist the force of gravity of the weight of the car. However, the spring device would be flexible enough so that when the extreme upward pressure of a bump or pothole should happen, the spring would compress and allow the ball to ride up the channel the two or three inches necessary to absorb the blow.

Preferably, the spring would provide enough upward pressure to countervail a moderate downward pressure from the cornering aid device. Thus, in normal cornering, the locking bar need not be employed. However, in an extremely sharp turn, when the wheels, thus effected/affected by the forward force of inertia, are on the verge of leaving the road, the locking rod would be activated. This would make the ball absolutely immovable up the channel and thus able to take the full downward force of the cornering aid device, and thus stay in firm contact with the road.

Since the turbofan engines may create considerable wind resistance, a wind screen may be provided in front of them. The middle part of such a wind screen, which may preferably be in front of the exhaust pipe of the backward-thrust turbofan engine, lowers automatically when the engine is activated, in order to allow the exhaust thrust a free path.

The balls or spherical wheels upon which the car rolls are generally hollow. There are ball bearing constructions inside the ball at both ends of the axle. The outer part of the construction, which is stationary and connected to the axle cap, preferably bears the weight of the car. The inner part may be connected to the axle, and can turn freely because it does not bear the weight of the car.

In one preferred form of the invention, the spherical or partially spherical wheels may have strips at that portion thereof which will be in contact with the surface on which the vehicle is driving. Preferably, the strips will be replaceable Teflon® strips.

In one form of the invention, the spherical ball may be divided into three parts, comprising a center strip where the ball makes contact with the road, and a pair of lateral strips on either side of the central strip. These parts may be joined together in an appropriate manner including a dowel-type system. In this way, the center strip can be replaced when it has become worn. The center strip may be made of a composite material, customized to handle different environmental conditions. Thus, the center strip may be selected by the user so as to best reflect the driving conditions and provide maximum safety in the circumstances.

DETAILED DESCRIPTION OF THE DRAWINGS

Figure 1:
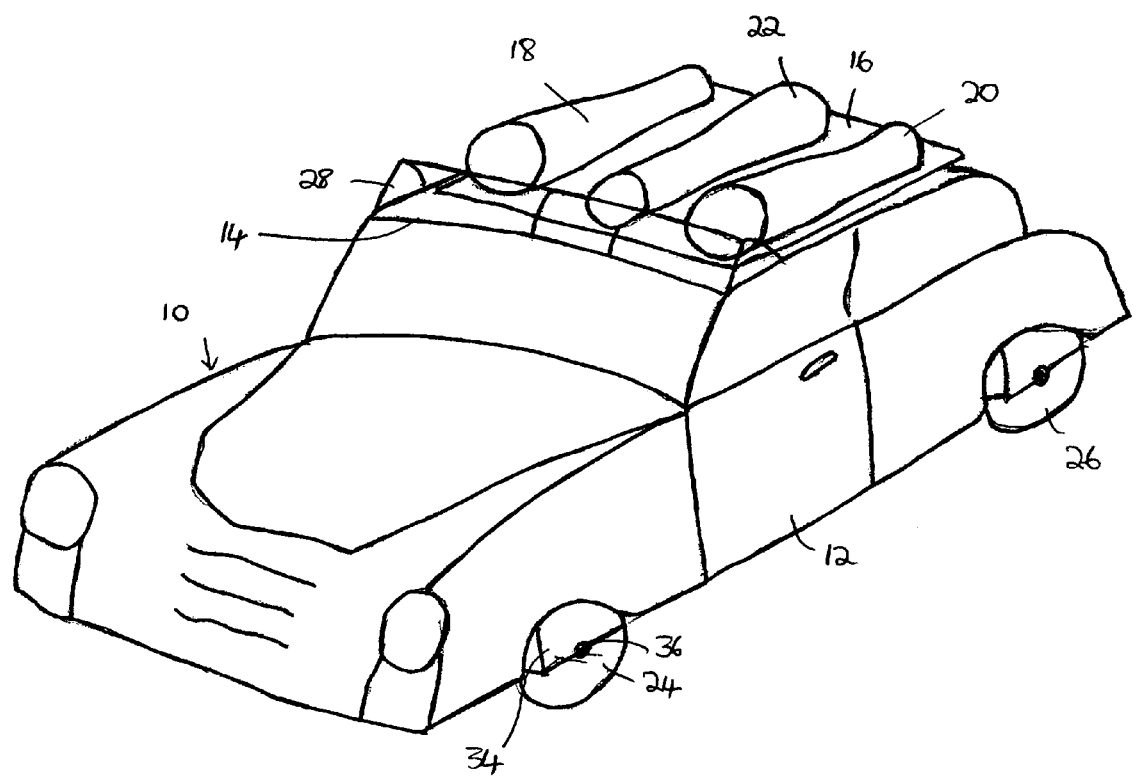
FIG. 1 is a perspective view of a vehicle constructed in accordance with the present invention including three turbofan engines and spherical or substantially spherical wheels.

Reference is now made to the enclosed Figures in describing specific examples and representations of preferred embodiments of the invention. While different forms of the invention are shown in the drawings, it will be appreciated that the invention is not limited to the specific construction illustrated herein.

Reference is now made to FIG. 1 of the drawings which shows a vehicle 10 in accordance with one aspect of the invention. The vehicle 10 comprises a conventional body 12 including engine, cabin and other typical features. The body 12 has a roof 14, the roof 14 supporting a platform 16.

The vehicle 10 includes a pair of forward-thrust turbofan engines 18 and 20, defining a space there between in which a rear-thrust turbofan engine 22 is located. In use, the vehicle 10 is propelled forward by the operation of the engines 18 and 20, and a backward-thrust for reversing or stopping the vehicle, is provided by the engine 22. The body 12 of the vehicle 10 rolls on four substantially or partially spherical wheels, including a pair of front wheels 24, and a pair of rear wheels 26.

As mentioned, the engines 18 and 20, providing a forward thrust, propel the vehicle 10 so that it is able to roll on the front and rear wheels 24 and 26 respectively. It is to be noted that the thrust provided by the engines 18 and 20 respectively may differ with respect to each other, depending upon the direction of movement of the vehicle 10. Thus, to aid in cornering, when the vehicle 10 enters a curve, the existing power may be maintained in the outermost engine 18 or 20, depending upon the direction of the curve, while the innermost engine 20, or 18 is reduced. The amount of variation, including reduction of thrust by a particular engine, may be controlled by a computer, and the extent of such variation will obviously depend upon such criteria as the speed of the vehicle, as well as the sharpness of the curve.

To further facilitate movement of the vehicle, the platform 16, upon which the engines 18, 20 and 22 are mounted, may turn with respect to the vehicle 10 in a manner which, once again, matches the sharpness of the curve and the speed of the vehicle. In one form of the invention, the platform 16 may rotate in the appropriate direction in response to the movement of the steering wheel. Alternative arrangements are possible wherein the rotation of the platform 16 may be in response to speed and level sensors, which automatically adjust the position of the platform to provide optimal thrust as well as stability in a given situation.

The rearward thrust of the engine 22, located in the middle of the platform 16 may typically be used, in accordance with one aspect of the invention, for emergency-type braking. When a brake pedal within the cabin is depressed beyond a certain point, the engine 22 may be activated, at the same time altering or switching off the forward thrust of engines 18 and 20, and initiating the rearward thrust of engine 22 to stop the vehicle.

It will also be seen in FIG. 1 that a wind screen 28 is provided, and is located so as to reduce the wind resistance of the engines by deflecting the wind in a more aerodynamically efficient way. The middle section will be lowered automatically when the engine 22 is activated, allowing the free exhaust of thrust exiting from this engine.

The front and rear wheels 24 and 26 roll, and may comprise four hollow Teflon® balls which are joined to ball casings 34 by axle caps 36 and other hardware to be described in further detail below.

Figure 2:
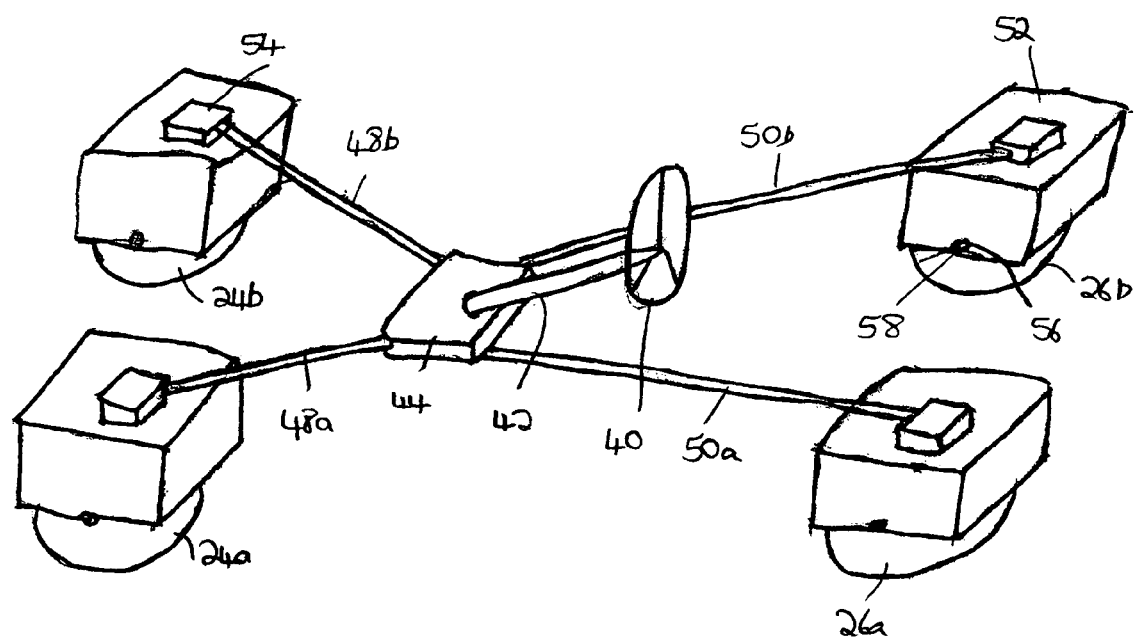
FIG. 2 is a schematic representation of a steering arrangement in accordance with one aspect of the present invention.

With reference to FIG. 2 of the drawings, this Figure illustrates a schematic representation of the steering system and arrangement for the vehicle in accordance with the present invention.

FIG. 2 shows a pair of front wheels 24a and 24b in the shape of a sphere, a portion thereof, or a substantial sphere, and a pair of rear wheels 26a and 26b. The steering system in FIG. 2 shows the provision of the steering wheel 40 which would of course be located in the cabin of the vehicle under normal circumstances. The steering wheel 40 rotates a steering column 42, the steering column 42 connected at its opposing end to a power steering unit 44. The power steering unit 44 in turn connects to a pair of front wheel tie rods 48a and 48b, and a pair of rear wheel tie rods 50a and 50b, each of the tie rods connecting at one end to the power steering unit 44, and at their other ends to the wheel casings 52. Each of the tie rods 48a, 48b, 50a and 50b attach to a gear housing unit associated with each of the ball casings 52, and, in accordance with normal principles translate any rotation of the steering wheel 40 to appropriate movement of the wheels 24a, 24b, 26a and 26b for steering purposes. It will be noted that each of the wheels are connected to their respective ball casings by means of an axle 56, terminating in an axle cap 58.

Figure 3:
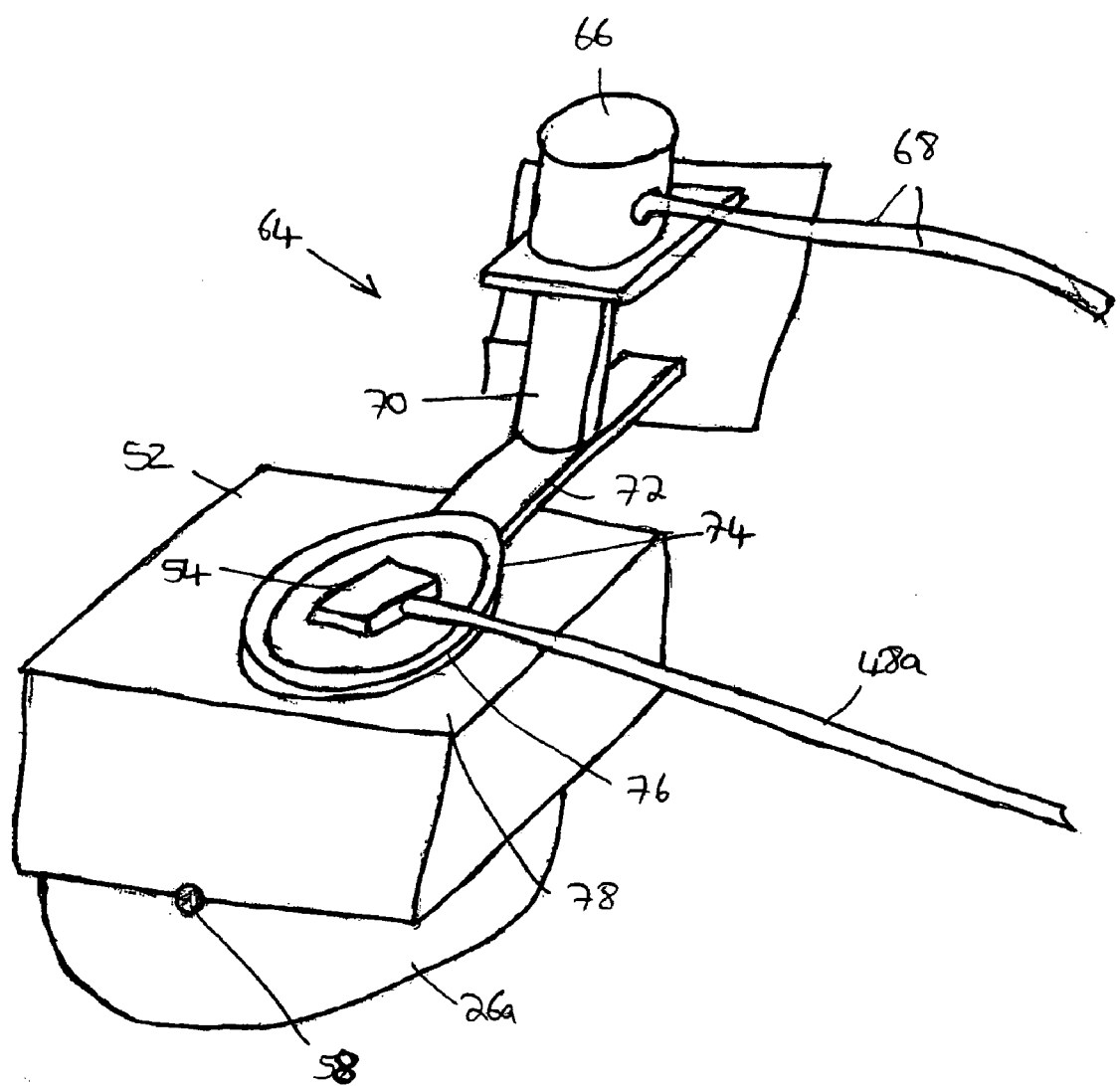
FIG. 3 is a perspective view showing a pneumatic device used in cornering to provide downward pressure on a ball casing, in accordance with one aspect of the invention.

In FIG. 3 of the drawings, a stabilizing device 64 is shown, and is associated with each of the casings 52. The stabilizing device 64 is designed to provide additional stability and safety features to the vehicle, particularly during the navigation of turns or curves, and also to provide additional traction where the surface upon which the vehicle 10 is riding may be slippery or slick, and some form of enhanced traction is desirable.

In FIG. 3, the stabilizing device 64 includes a motor 66 which receives its power through conventional mechanisms through wires or cables 68, in turn connected to a battery or some other form of power. The cables 68 are attached to the battery, which is preferably controlled by an onboard computer. The computer, through a series of appropriately located sensors, determines how much power may be needed to keep the wheels, or spherical balls 24 and 26 firmly on the road. In operation, the motor 66 applies a downward force by means of a force bar 70, the force bar 70 pressing down on an arm 72 of the top part of a ball bearing construction 74. The top part 74 is connected to a corresponding bottom part 76, which is able to turn freely. This bottom part 76 is itself attached to the top surface 78 of the ball or wheel casing 52, and turns with it. In this manner, a downward force of appropriate magnitude and strength can be transferred to the wheels 24 and 26 so as to keep them firmly on the road, and to minimize or reduce the possibility of "roll" when the vehicle 10 may be become somewhat destabilized through moving at speed through a turn, curve or otherwise traveling on a slippery surface.

Each of the ball casings 52 has associated therewith the stabilizing device 64, and they may work together as a unit, such as when the car is on a slippery surface and all four need to be used in applying the downward force, or they may work in front and rear pairs. For example, the left front and left rear stabilizing devices 64 may work together during travel through a left curve or turn to provide the additional stability as has already been discussed.

Figure 4:
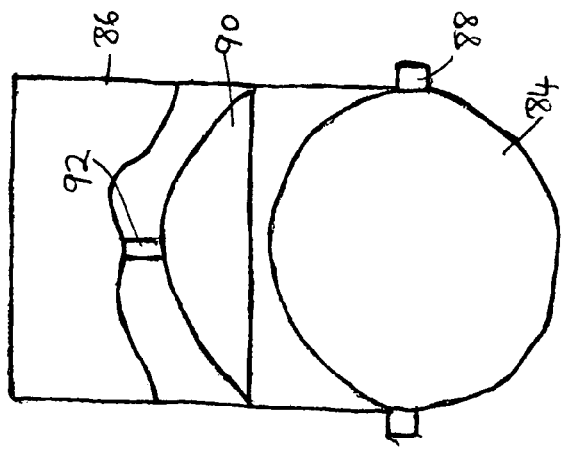
FIG. 4 is a front view of a ball casing and spherical wheel, partially cut away, to illustrate the braking system in accordance with one aspect of the invention.

In FIG. 4 of the drawings, there is shown a wheel 84 mounted in a casing 86, and showing one mechanism for braking in accordance with the invention. The wheel 84 is secured to the casing by means of an axle 88 running through the wheel 84 and fastening to the casing walls 86, as will be described in due course. FIG. 4 shows the casing partially broken away to reveal within the casing a brake cap 90 mounted on a shaft 92, and which operates hydraulically in response to the user depressing a pedal. The normal position is shown in FIG. 4 wherein the brake cap 90 is placed and not in contact with the wheel 84. However, upon actuation of the appropriate brake lever, the shaft 92 is moved downward, as is the brake cap 90 mounted thereon. The brake cap 90, which is dome-shaped, covers and engages the outer surface of the wheel 84 within the casing, causing the rotation of the wheel 84 to slow and stop. As with any conventional vehicle, the degree and sharpness of the braking will depend upon how hard the lever is pushed, and, as a result thereof, the nature of the engagement established between the brake cap 90 and the wheel 84. Thus, a light use of the pedal will cause some slowing, whereas a more vigorous use of the pedal will slow the vehicle much faster. It has already been noted above that the braking system, as shown in FIG. 4 of the drawings, can be used in conjunction with the engine 22 shown in FIG. 1 of the drawings, which provides a thrust in a direction which is opposite to that of the regular engines 18 and 20, and which also slows the vehicle.

Figure 5:
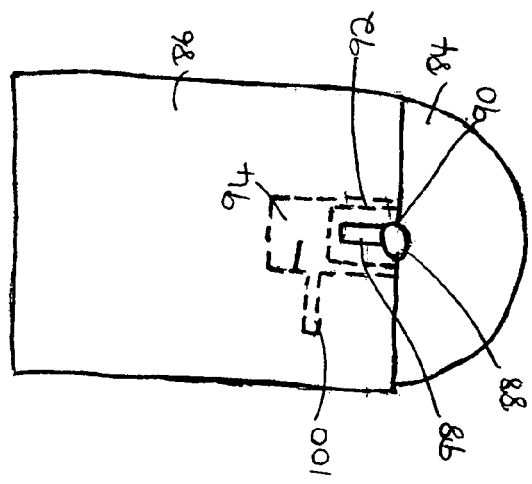
FIG. 5 is a side view of a ball casing and spherical wheel of the invention including one representation of a shock absorbing mechanism of the present invention.

With reference to FIG. 5 of the drawings, there is shown a shock absorption system, which is one example of such a system which may be used in accordance with the invention. The same reference numerals will be used in FIG. 5 as were used in FIG. 4. Thus, the wheel 84 is located within the casing 86, the wheel 84 rotating about an axle 88, the axle 88 having an axle cap 90. It will be seen in this Figure that a movable projection 92 is able to slide up and down within a channel 94 on the inside of the ball casing 86. The amount of such movement may vary according to need, but in one embodiment the movable projection 92 can move up an down approximately three inches, which it will do whenever a bump in the road is encountered, and pushes the wheel 84 upward. This will, thus, be absorbed by the sliding of the projection 92 within the channel 94.

On the outside of the casing 96, there is provided a groove 98 which is designed to accommodate the axle 88, as it moves up and down.

It will be appreciated that, when the stabilizing device as shown in FIG. 3 may be activated, the wheel 84 must be prevented, or at least partially prevented from moving upward, since the purpose of the stabilizing device is to place a downward pressure or force on the wheel 84. As such, when the stabilizing device 64 is activated, the shock absorption system shown in FIG. 5 of the drawings can be temporarily disabled, or its effects reduced. One mechanism for achieving this is to provide a lock or bar 100 which is located laterally of the channel 94, and which can slide into the channel 94 just above the movable projection 92, so as to severely restrict or prevent any upward movement of the movable projection 92.

Figure 6:
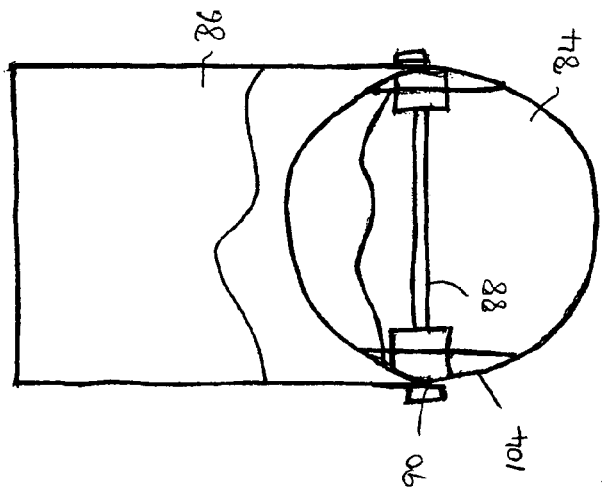
FIG. 6 is a front view, partially cut away, of the ball casing and spherical wheel in accordance with the invention, showing the axle and ball-bearing construction.

In FIG. 6 of the drawings, which shows a partly cut away casing 86 containing a wheel 84, there is shown more clearly the axle 88 running through the wheel 84. The construction 104 operates with the axle, and absorbs the weight of the vehicle while at the same time allowing the ball or wheel 84 to roll freely. The construction 104 is mounted on the inside of the wheel or the ball 84.

Figure 7:
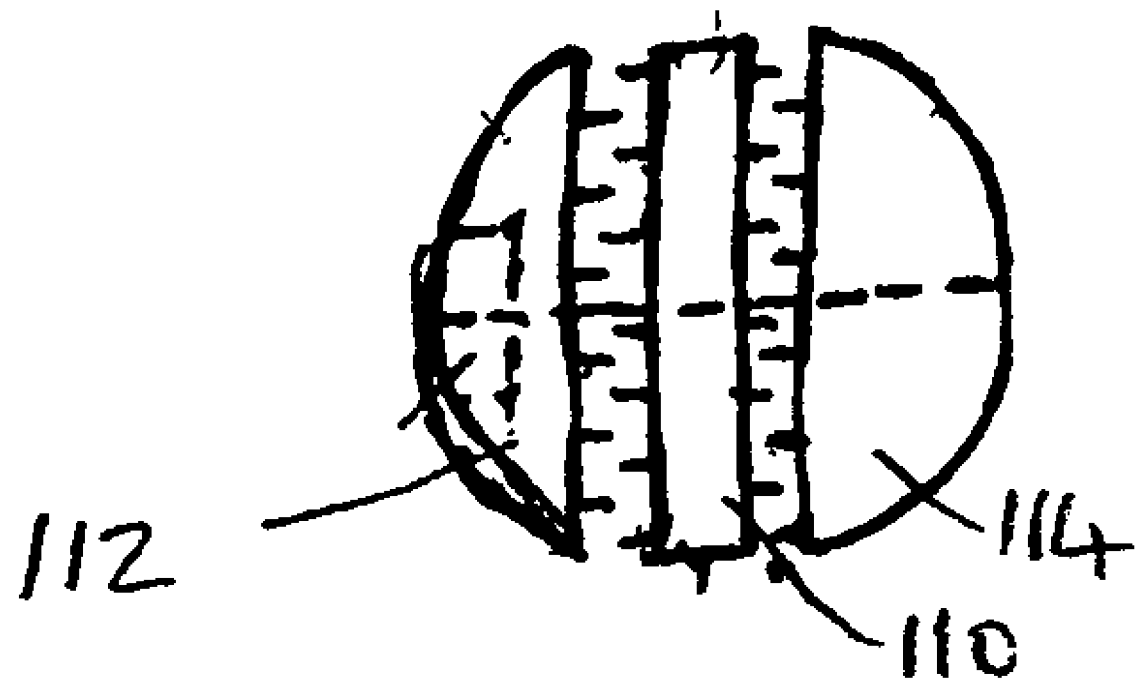
FIG. 7 is a schematic representation of a wheel in accordance with the present invention, including cental and lateral portions with a replaceable center portion.

In FIG. 7 of the drawings, there is shown a further embodiment of a wheel or ball in accordance with the invention. In this embodiment, the wheel or ball is divided into three parts, including a center strip 110 and two lateral strips 112 and 114. The center strip, which is the portion of the ball with which contact with the road is established, is connected by any appropriate means to each of the lateral sections 112 and 114 in an acceptably removable fashion. A dowel system, or any other secure and safe locking mechanism for securing these components together, but at the same time allowing their disassembly, may be used.

Since the center strip 110 is that portion of the wheel which will be in contact with the surface on which the vehicle rides, this is the section that needs to be replaced after a certain amount of use. In such a situation, the lateral portions 112 and 114 are removed, and a new center portion replaces the existing center portion, and may have the appropriate wear, tread or other physical parameter which best suits the environment. Moreover, particular wheels may have center portions which are specifically designed for use in certain environments. For example, in the wet Pacific Northwest, the center portion may be customized so as to better handle rain and wet surfaces, while in the Southwest it will be configured for drier weather. Further, in areas where snow is prevalent, a center strip 110, having the ability to best deal with snow-covered surfaces would of course be used.

The invention may have other applications in addition to that of a vehicle of the type described and illustrated above. For example, the invention may be used to advantage on a train line. In this regard, a line, which may be Teflon® coated, may be provided along a described route, such as through the center of the state of California. Various depots or stop-spots may be established.

In other embodiments, locomotives, passenger or freight cars may be configured to run on existing track lines, or specially adapted or constructed track lines. In one form, a monorail down the center of a regular track may be provided, which may be a few inches lower than the level of the regular track, and lowered or raised as needed.

The invention is not limited to the precise constructional details described and illustrated herein.

The invention claimed is:

1. A vehicle having a chassis comprising:
   at least two turbine engines mounted on the chassis for providing thrust to propel the vehicle over a surface, each of the turbofan engines being capable of delivering a variable thrust depending on the direction and/or speed of the vehicle;
   four wheels located about and mounted on the chassis wherein at least two of the wheels are substantially spherical or partially spherical in shape and wherein at least one of the wheels is comprised of three components comprising a center strip portion and two lateral portions, the components being separable from each other to permit replacement of the center strip portion when required due to wear thereon.

2. A vehicle as claimed in claim 1 wherein at least one turbofan engine is mounted on the vehicle in an orientation to propel the vehicle in a forward direction.

3. A vehicle as claimed in claim 2 where two turbofan motors are provided in spaced relationship on a roof of the chassis.

4. A vehicle as claimed in claim 2 wherein two turbofan engines are provided and each of the turbofan engines is capable of delivering a variable thrust depending on the direction and/or speed of the vehicle.

5. A vehicle as claimed in claim 2 comprising a pair of forward thrust turbofan engines mounted in a spaced relationship on the roof of the vehicle and positioned to move the vehicle in a forward direction, and a single rear thrust turbofan engine positioned to move the vehicle in a rearward direction.

6. A vehicle as claimed in claim 5 wherein the rear thrust turbofan engine is mounted between the pair of forward thrust turbofan engines.

7. A vehicle as claimed in claim 2 further comprising a platform mounted on a roof of the vehicle, the platform being configured to receive and hold the at least one turbofan engine.

8. A vehicle as claimed in claim 7 wherein the platform is movable relative to the roof of the vehicle, the platform being movable according to the direction of travel of the vehicle so that the turbofan engines mounted thereon are capable of selectively providing thrust substantially in the direction of movement of the vehicle.

9. A vehicle as claimed in claim 2 further comprising a selectively movable windscreen associated with the turbofan engines.

10. A vehicle as claimed in claim 1 wherein the wheels are substantially hollow spheres.

11. A vehicle as claimed in claim 1 wherein the wheels are partial hollow spheres.

12. A vehicle as claimed in claim 1 wherein all of the wheels are substantially spherical in shape and are mounted in wheel casings.

13. A vehicle as claimed in claim 12 wherein each wheel is mounted on an axle running substantially diametrically therethrough, the axle having ends located outside the wheel which are supported by the wheel casing.

14. A vehicle as claimed in claim 13 further comprising a bearing device on the axle within the wheel and which abuts against an inner surface of the wheel.

15. A vehicle as claimed in claim 1 wherein the wheels are coated with a material to reduce friction with the surface on which the vehicle is moving.

16. A vehicle as claimed in claim 15 wherein the material is Teflon®.

17. A vehicle as claimed in claim 1 further comprising a brake member, the brake member comprising a substantially dome shaped pad hydraulically operated so as to be engageable with a wheel when activated and distanced from the wheel when not activated.

18. A vehicle as claimed in claim 17 wherein the dome shaped pad is comprised of leather or other suitable material.

19. A vehicle as claimed in claim 12 further comprising a shock absorption member between the wheel and the casing to absorb at least partially bumps on the surface on which the vehicle is moving from being transmitted to the chassis.

20. A vehicle as claimed in claim 19 wherein the shock absorption member comprises a channel in a wall of the casing and a projection on the wheel or axle which travels in the channel against the force of a biasing means.

* * * * *